United States Patent
Ellis et al.

(10) Patent No.: US 10,576,703 B2
(45) Date of Patent: Mar. 3, 2020

(54) TIRE SEALER SYSTEM AND METHOD

(71) Applicant: HOLT LLOYD INTERNATIONAL LIMITED, Manchester, Greater Manchester (GB)

(72) Inventors: Bruce Ellis, Manchester (GB); Richard Hitchman, Bromsgrove (GB)

(73) Assignee: Holt Lloyd International Limited, Manchester (GB)

( * ) Notice: Subject to any disclaimer, the term of this patent is extended or adjusted under 35 U.S.C. 154(b) by 234 days.

(21) Appl. No.: 15/580,220

(22) PCT Filed: Jun. 30, 2016

(86) PCT No.: PCT/GB2016/051957
§ 371 (c)(1),
(2) Date: Dec. 6, 2017

(87) PCT Pub. No.: WO2017/001849
PCT Pub. Date: Jan. 5, 2017

(65) Prior Publication Data
US 2018/0162079 A1    Jun. 14, 2018

(30) Foreign Application Priority Data

Jun. 30, 2015 (GB) .................................. 1511468.9

(51) Int. Cl.
*B29C 73/16* (2006.01)
*B29L 30/00* (2006.01)

(52) U.S. Cl.
CPC .......... *B29C 73/163* (2013.01); *B29C 73/166* (2013.01); *B29L 2030/00* (2013.01)

(58) Field of Classification Search
CPC ..... B29C 73/002; B29C 73/166; B29C 73/16; B29C 73/163; B60C 5/004; B29D 30/0685

USPC ............................. 106/33; 156/115; 523/166
See application file for complete search history.

(56) References Cited

U.S. PATENT DOCUMENTS

| | | |
|---|---|---|
| 4,501,825 A | 2/1985 | Magyar et al. |
| 6,605,654 B1 | 8/2003 | Fang et al. |
| 2013/0072594 A1* | 3/2013 | Okamatsu ............. B29C 73/163 523/166 |

FOREIGN PATENT DOCUMENTS

| | | |
|---|---|---|
| CN | 103497731 | 1/2014 |
| FR | 2753653 | 3/1998 |
| JP | 2010001394 | 1/2010 |

OTHER PUBLICATIONS

Search Report issued in Chinese Application No. 201680038162.1 dated May 30, 2019.
International Search Report of PCT/GB2016/051957 dated Oct. 12, 2016.
International Written Opinion of PCT/GB2016/051957 dated Oct. 12, 2016.

* cited by examiner

*Primary Examiner* — Robert C Dye
*Assistant Examiner* — Alexander D Booth
(74) *Attorney, Agent, or Firm* — Barnes & Thornburg LLP; Elizabeth A. Peters

(57) ABSTRACT

A kit for repairing a tire, comprising, a first pressurized container including a first fluid and a second pressurized container including a second fluid. The first fluid comprises a first propellant and an emulsion comprising styrene butadiene rubber, a foaming agent, and an antioxidant. The second fluid comprises isopropyl alcohol and a second propellant.

12 Claims, 4 Drawing Sheets

TIRE SEALER SYSTEM AND METHOD

CROSS REFERENCE TO RELATED APPLICATIONS

This application is a U.S. nationalization under 35 U.S.C. § 371 of International Application No. PCT/GB2016/051957, filed Jun. 30, 2016, which claims priority to United Kingdom Application No. 1511468.9 filed Jun. 30, 2015.

FIELD OF THE DISCLOSURE

The present disclosure relates to tire inflators used to inflate vehicle tires and more particularly to tire inflators that are used to temporarily inflate a tire and seal a hole in the tire so that the operator of the vehicle can drive to a safe location.

BACKGROUND

Tire inflators that seal and inflate to provide a temporary fix to a punctured tire are well known, they allow the driver of a vehicle to drive to a garage to have the tire repaired without fitting a spare tire. Developments have been made in order to address several issues to improve their performance and practicality. More specifically, tire inflators comprise a sealant composition and a source of pressurised gas, the pressurised gas serving to transfer sealant composition from a reservoir into a tire requiring repair and then serving to inflate the tire once sealant composition has to one extent or another sealed an aperture giving rise to a puncture. The source of pressurised gas can be derived from a mechanical compressor or it may be derived from an aerosol type canister in the form of a propellant. Prior art propellants include chlorofluorocarbons. However, since the manufacture of these have been phased out, as a result of their ozone depleting nature new propellants were required. Requirements for a suitable propellant include low vapor pressure (to avoid high pressures potentially resulting in tire over inflation or canister rupture), environmental acceptability, lack of flammability as well as the chemical and physical properties that allow the propellant to mix well with the tire sealant. WO 2011/133546 A2 provides a tire inflator with an environmentally acceptable propellant which is non-flammable at ambient conditions and has acceptable vapor pressure. Whilst issues relating to propellant have been widely explored the sealant composition compatible with environmentally acceptable propellants of known tire inflator systems is often nonoptimal. In particular, the usage of a relatively low vapour pressure propellant, for the reasons mentioned above, means that loss of gas can limit the durability of the repair as only a small amount of leakage is necessary for tire pressure to fall below acceptable levels. There is therefore a need for a tire inflator sealant composition which is compatible with an environmentally acceptable propellant and which gives improved puncture sealing, such as, as measured over time subsequent to a sealing operation being carried out.

In addition when a tire leak is occasioned by a puncture an issue arises where the puncture represents an aperture of significant size in a tyre. Apertures of up to 6 or even 10 mm in diameter can be occasioned when an object impinges upon a tyre, such as at high speed and tire sealant compositions particularly of a canister type are not currently available to repair such punctures. Large apertures realizes significant sealant propellant losses on tire repair when using a sealant composition and a significant loss of propellant and sealant can occur before a seal is realizable, if realizable at all.

Further to the problem of repairing a punctured tire in which the intention is typically to replace the tire at the earliest convenient opportunity, and hence the longevity of the sealing effect is less essential, it is becoming increasingly useful in situations where a poorly fitting tire or defective seating of a tire needs to be repaired and a permanent or semipermanent basis for intended ongoing use of the tire without replacement. This is particularly significant with so termed "alloy" wheel rims in which corrosion can give rise to poor sealing between a tubeless tire and the wheel rim. There is therefore a need for a tire sealant composition suitable for durable and effective permanent repair.

SUMMARY

The present invention in its various aspects is as set out in the appended claims.

In a first aspect of the present invention there is provided a kit of parts, or system, suitable for performing the method of the first aspect. The kit or system for use as tire sealer comprises a first pressurized container provided with a first fluid comprising a first propellant, a styrene butadiene rubber emulsion and a foaming agent and a second pressurized container provided with a second fluid comprising a second propellant and isopropyl alcohol.

In a second aspect of the present invention the kit of the first aspect is used in a method for inflating a tire. in the method contents of the first pressurized container are transferred into a tire, and subsequently contents of the second pressurized container transferred into the tire, interaction between the styrene butadiene rubber emulsion in the first fluid and the isopropyl alcohol in the second fluid serves to break the emulsion. As the styrene butadiene emulsion breaks, agglomerated particles form that can cover and/or fill a hole or puncture in the tire. Eventually, sufficient agglomerated particles bind together and seal the hole or puncture in the tire.

The present invention in its various aspects is as set out in the appended claims.

The above combination of components provide for the effective distribution of the proto-sealant rubber emulsion within a tire cavity from the first container but without necessitating significant internal pressure which can expel the sealant through an aperture in the tire. The second container provides a source of pressure to inflate the tire and to change the form of the rubber from a low viscosity emulsion foam to a high viscosity fluid with the rubber as the continuous phase and which is thereby capable of sealing an aperture, such as in a tire.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing features, and other features and advantages of the invention, are apparent from the following detailed description taken in conjunction with the accompanying drawings in which:

Other aspects and advantages of the present invention will become apparent upon consideration of the following detailed description, wherein similar structures have like or similar reference numerals.

DETAILED DESCRIPTION

The present invention is directed to tire repair systems and methods of using tire repair systems to seal a tire. While systems and methods of the present invention may be embodied in many different forms, several specific embodiments are discussed herein with the understanding that the present invention is to be considered only as an exemplification of the principles of the invention, and it is not intended to limit the invention to the embodiments described.

Figure 1:
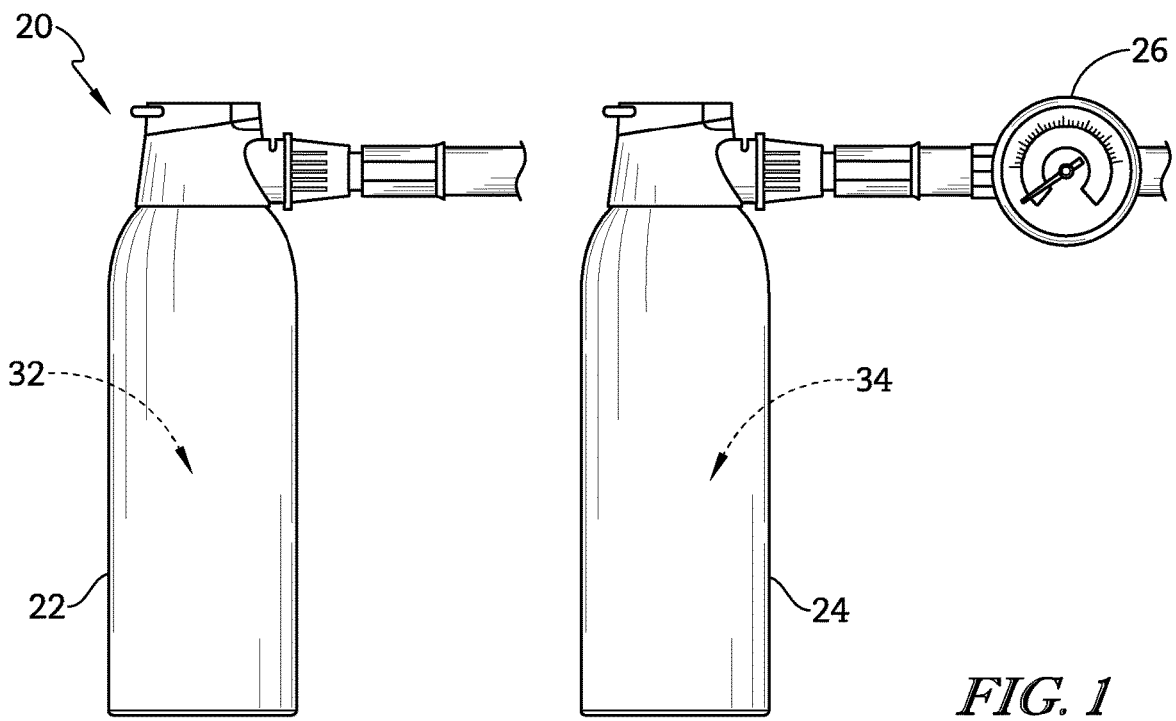
FIG. 1 is a perspective view of a tire repair system including a first pressurized container and a second pressurized container.
Figure 2:
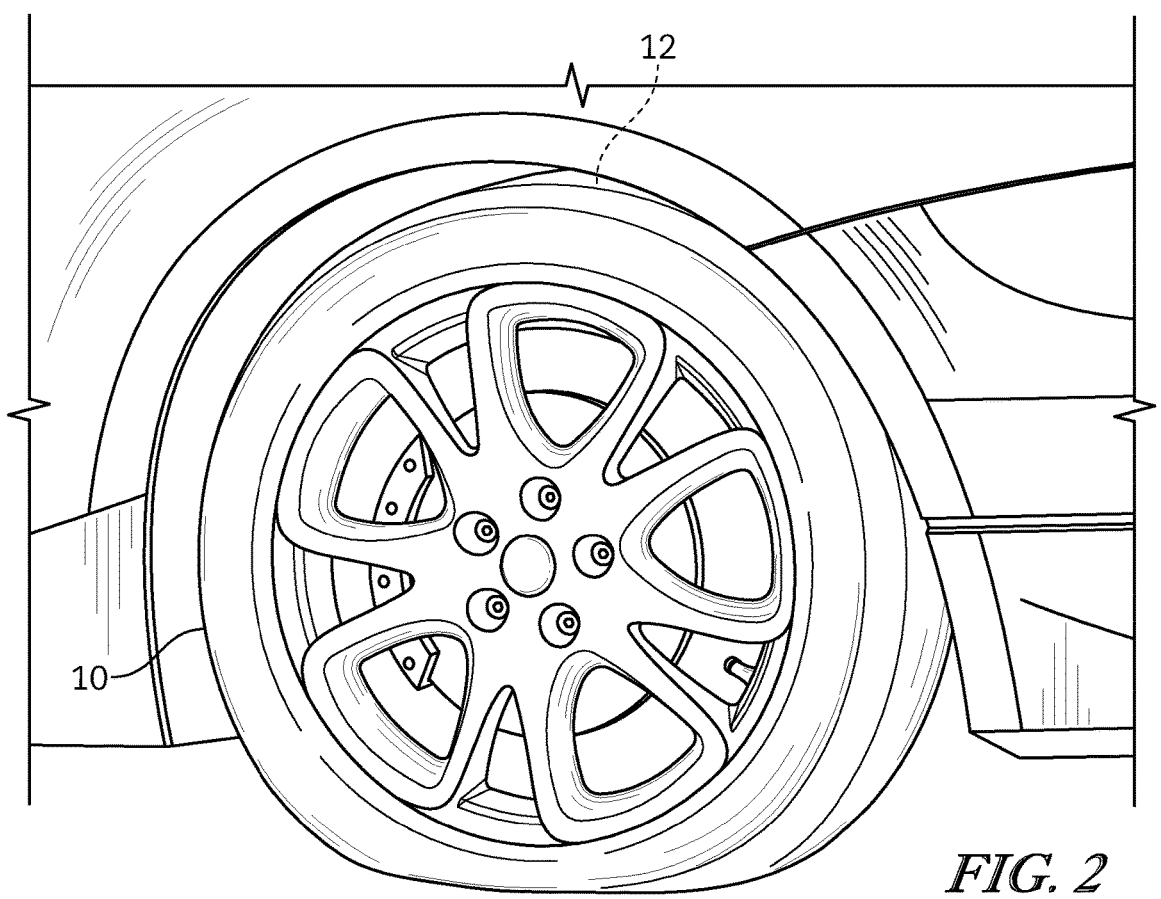
FIG. 2 is a perspective view of a flat tire attached to a car that has a puncture or a hole in the tire.

Referring to FIG. 1, a tire repair system 20 is depicted as including a first pressurized container 22 and a second pressurized container 24. As suggested by FIG. 2, a tire 10 in need of repair may include at least one puncture or hole 12. A tire repair method includes transferring a first fluid 32 from within the first pressurized container 22 into a tire 10, followed by transferring a second fluid 34 from within the second pressurized container 24 into the tire 10. The first fluid 32 includes the first propellant and a sealant composition. The sealant composition in this example includes the emulsion of styrene butadiene rubber (SBR) in water.

The second fluid 34 includes the second propellant and isopropyl alcohol, also called isopropanol (IPA). After the second fluid 34 is transferred into the tire 10, SBR and IPA alcohol interact to form a rubber agglomerate. The agglomerated rubber acts to seal one or more holes in the tire to repair it. Greater detail and examples of the tire repair method will be discussed in greater detail hereinbelow.

The first container 22 may be an aerosol can that includes the first fluid 32. The first fluid 32 includes the first propellant and the sealant composition. The first fluid 32 may comprise from about 5 weight percentage (wt %) to about 25 wt % of the first propellant. Preferably, the first fluid 32 may comprise from about 5 wt % to about 10 wt % of the first propellant. Most preferably, the first fluid 32 comprises about 6 wt % of the first propellant. The first fluid 32 may comprise from about 75 wt % to about 99 wt % of the sealant composition. Preferably, the first fluid 32 comprises from about 85 wt % to about 95 wt % of the sealant composition. Most preferably, the first fluid 32 comprises about 94 wt % of the sealant composition. The first fluid 32 comprises about 6 wt % of the first propellant and about 94 wt % of the sealant composition.

Aerosol type propellants are contemplated in accordance with the present invention. Representative propellants that may be used include but are not limited to propane, butane, isobutane and trans-1,3,3,3-Tetrafluoro-1-propene; and combinations thereof. Preferably the first propellant includes a flammable propellant such as butane, isobutane, and propane or more preferably trans-1,3,3,3-Tetrafluoro-1-propene, also called HFO1234ze. HFO1234ze is advantageously non-flammable by ASTM E-681 and EU A11 test methods. These propellants are preferred as they provide a low vapour pressure and serve to dispense the first fluid from the first container into a tire but without sufficient force, or volume (at the stated levels) for the fluid to be significantly expelled through a leak before application of the second fluid to occasion the conversion of the first fluid to a form which enables sealing.

More preferably the first propellant comprises, consists essentially of or consists of butane and isobutane. Most preferably the first propellant comprises about 46 wt % of n-butane, about 23 wt % of isobutane, and about 1 wt % of propane. Preferably the first fluid 32 includes sufficient propellant to disperse the SBR throughout a tire 10 but without expelling significant fluid. In particular a weight ratio of SBR in the emulsion to butane propellant is may be 6:1 to 8:1, preferably 15:2. SBR to total propellant ratio may be 4:1 to 6:1, preferably 5:1 with a preferred propellant composition, such as 46 wt % of n-butane, 23 wt % of isobutane, and 1 wt % of propane (each +/−2%). In other embodiments, the first fluid 32 may not include sufficient propellant to fully inflate the tire 10.

The sealant composition may comprise, or consist essentially of, or consist of an emulsion of SBR in water with at least one foaming agent. The sealant composition includes an aqueous dispersion of SBR. The aqueous dispersion of SBR may comprise from 60 to 75% SBR, most preferably about 67 wt % SBR. In the following, the given weight percentages of SBR exclude the weight of water. The sealant composition may comprise from about 13 wt % to about 40 wt % of SBR. Preferably, the sealant composition comprises from about 26 wt % to about 34 wt % of SBR. Most preferably, the sealant composition comprises about 31 wt % of SBR. The sealant composition may comprise from about 26 wt % to about 80 wt % of water (including the water that is part of the aqueous dispersion of SBR). Preferably, the sealant composition comprises from about 38 wt % to about 52 wt % of water. More preferably, the sealant composition comprises about 31 wt % of SBR to about 47 wt % of water. Most preferably, the sealant composition comprises about 47 wt % of water.

When the first fluid 32 is transferred into the tire 10, a foam including the emulsion of SBR fills at least a portion of the tire. The presence of the at least one foaming agent enables the creation of the foam made of the emulsion of SBR with the first propellant acting as a blowing agent and a plurality of cells formed in the foam that are inflated by the first propellant acting as a blowing agent. Examples of foaming agents may include potassium oleate, ammonium lauryl sulfate, other suitable surfactants, and/or any other suitable foaming agent(s).

The sealant composition may include potassium oleate and/or ammonium lauryl sulfate as a foaming agent or agents. Other foaming agents, alone or in combination with any of the noted foaming agents, may additionally or alternatively be used. The sealant composition comprises from about 1 wt % to about 15 wt % of one or more foaming agents. Preferably, the sealant composition comprises from about 2 wt % to about 5.5 wt % of one or more foaming agents. Most preferably, the sealant composition comprises about 4 wt % of one or more foaming agents.

The sealant composition may comprise from about 1 wt % to about 10 wt % of potassium oleate. Preferably, the sealant composition comprises from about 2 wt % to about 4 wt % of potassium oleate. Most preferably, the sealant composition comprises about 3 wt % of potassium oleate. The sealant composition may include from about 0.1 wt % to about 5 wt % of ammonium lauryl sulfate. Preferably, the sealant composition includes from about 0.5 wt % to about 1.5 wt % of ammonium lauryl sulfate. Most preferably, the sealant composition comprises about 0.8 wt % of ammonium lauryl sulfate.

The sealant composition may include from about 1 wt % to about 10 wt % of potassium oleate and from about 0.1 wt % to about 5 wt % of ammonium lauryl sulfate. Preferably, the sealant composition includes from about 2 wt % to about 4 wt % of potassium oleate and from about 0.5 wt % to about 1.5 wt % of ammonium lauryl sulfate. Most preferably, the sealant composition includes about 3 wt % of potassium oleate and about 0.8 wt % of ammonium lauryl sulfate.

The sealant composition may optionally include an antioxidant. The inclusion of an antioxidant prevents discoloration and oxidation. In an illustrative embodiment, the sealant composition includes butylated hydroxyanisole (BHA) as an antioxidant. Alternatively or additionally, any other suitable antioxidant(s) may be used. The sealant composition may comprise from about 0.01 wt % to about 5 wt % of one or more antioxidants, for example, BHA. More preferably, the sealant composition includes from about 0.01 wt % to about 2 wt % of one or more antioxidants. Still more preferably, the sealant composition includes from about 0.01 wt % to about 0.5 wt % of one or more antioxidants, for example, BHA. Most preferably, the sealant composition comprises about 0.1 wt % of BHA.

The sealant composition may also optionally include a freezing point depressant. The presence of a freezing point depressant prevents the first fluid 32 from freezing in low temperatures. If the first fluid froze, water in the SBR emulsion might expand and rupture or otherwise damage the first fluid container 22. Further, the presence of a freezing point depressant prevents any valves from freezing during the transfer process. An example of a freezing point depressant is monopropylene glycol (MPG). One or more of MPG or any other suitable freezing point depressants may be utilized. The sealant composition may include from about 10 wt % to about 50 wt % of MPG. Preferably, the sealing composition includes from about 15 wt % to about 20 wt % of MPG. Most preferably, the sealant composition includes about 18 wt % of MPG.

The sealant composition may consist essentially of an emulsion of SBR in water and at least one foaming agent. In other embodiments, the sealant composition may consist essentially of an emulsion of SBR in water, at least one foaming agent, and an antioxidant. In some other embodiments, the sealant composition may consist essentially of an emulsion of SBR in water, at least one foaming agent, an antioxidant, and a freezing point depressant.

The second container 24 may be an aerosol can that includes the second fluid 34. The second fluid 34 includes the second propellant and IPA. The second fluid 34 may include from about 60 wt % to about 99 wt % of the second propellant. Preferably, the second fluid 34 may include from about 60 wt % to about 90 wt % of the second propellant. More preferably, the second fluid 34 may include from about 85 wt % to about 90 wt % of the second propellant. Most preferably, the second fluid 34 may include about 86.3 wt % of the second propellant. The second propellant is preferably a high vapour pressure liquid or a gas, preferably with an air component; carbon dioxide, nitrogen, argon or mixtures thereof.

The combination of a first butane based propellant and a second air derived propellant addresses several issues. First, the use of small quantities, such as as low as 6% based hydrocarbon, facilitates homogeneous admixture of the propellant with SBR based sealant. This enables a liquid to be dispensed to a tire which itself comprises enough propellant to cause foaming when expanding inside a deflated tire. Too much propellant blows sealant out of large puncture apertures (and is hence a reason why current products can be inadequate for large aperture punctures) and too little cannot drive sealant into a tire from a (first) fluid container. However, such an optimized first fluid cannot effectively inflate a tire nor will it break the SBR emulsion (or if it does foaming and even tire filling will not occur). Hence, further inflation with air alone is unsatisfactory. A second fluid is therefore required, butane and similar propellants can be ineffective at sub-zero temperatures for tire inflation. Hence, a second fluid comprising an air derived propellant with isopropanol gives both pressure and volume of gas for tire inflation whilst breaking the SBR emulsion to deposit the by then evenly distributed SBR derived from the foam on internal tire surfaces. This enables punctures of up to 6 mm diameter to be sealed, which has hitherto not been possible with single canister aerosol tire inflators.

The second fluid 34 may comprise from about 1 wt % to about 25 wt % of IPA. Preferably, the second fluid 34 may comprise from about 10 wt % to about 15 wt % of IPA. More preferably, the second fluid 34 may comprise about 13.6 wt % of IPA. Most preferably, the second fluid 34 may comprise about 86.3 wt % of the second propellant and about 13.6 wt % of IPA.

The second propellant, whilst preferably being air derived (as above), may alternatively, or in addition, include one or more of propane, butane, isobutane and trans-1,3,3,3-Tetrafluoro-1-propene. The second propellant may comprise butane, isobutane, and propane. The second propellant may comprise trans-1,3,3,3-Tetrafluoro-1-propene, also called EFO1234ze. HFO1234ze is advantageously non-flammable by ASTM E-681 and EU A11 test methods. The second propellant may include butane and isobutane. The second propellant may include about 46 wt % of butane, about 23 wt % of isobutane, and about 1 wt % of propane. In other embodiments, the second container 24 includes sufficient propellant to inflate the tire 10.

The second fluid 34 includes IPA to cause an agglomeration reaction when IPA breaks the SBR emulsion. As the SBR emulsion breaks, agglomerated particles form that can cover and/or fill a hole or puncture in the tire 10. Eventually, sufficient agglomerated particles bind together and seal the hole or puncture in the tire 10.

Figure 3:
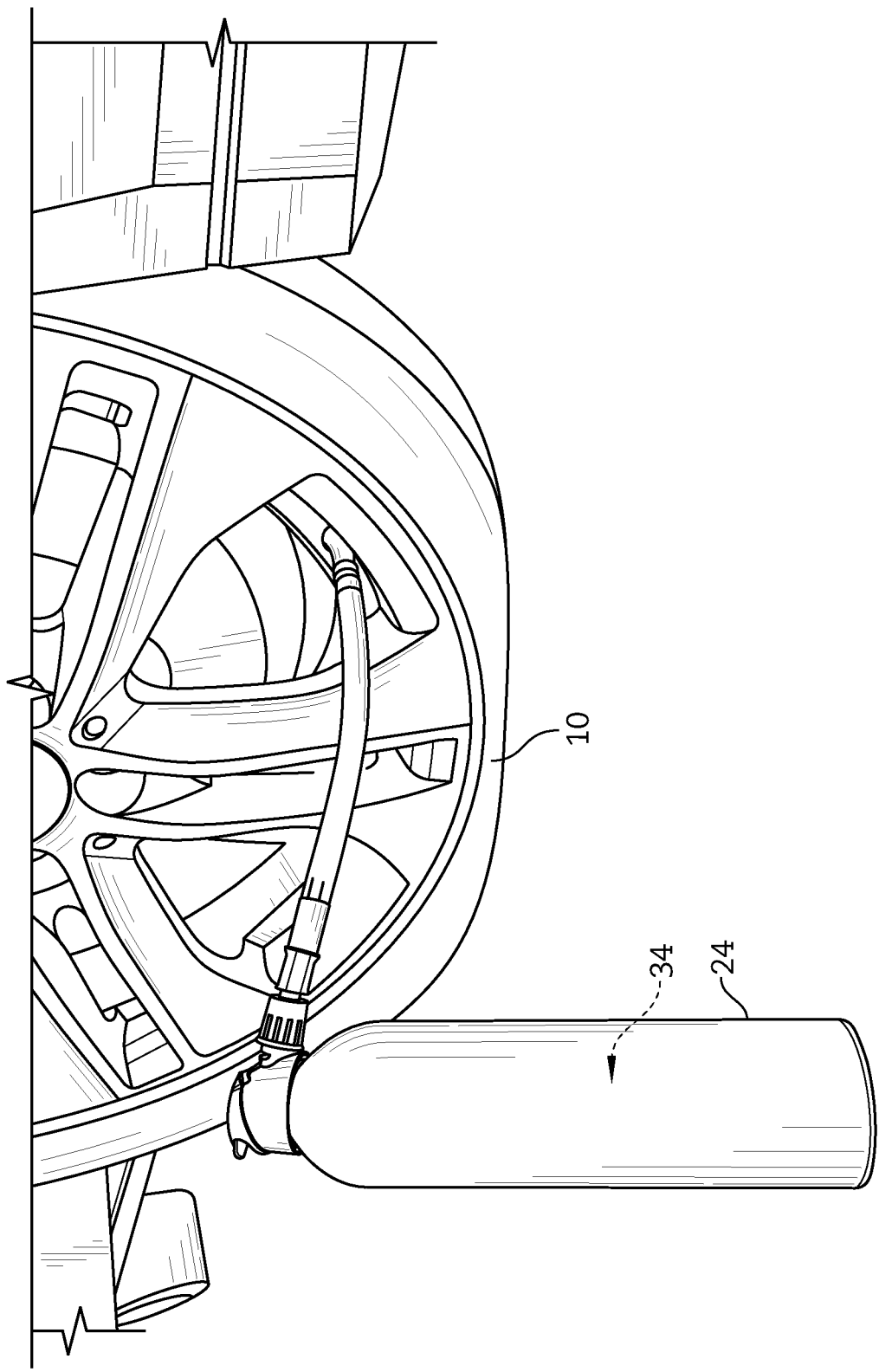
FIG. 3 is a perspective view of the tire from FIG. 2 and the first pressurized container from FIG. 1 wherein the contents of the first pressurized container are being transferred to the tire.

When the first fluid 32 is transferred into the tire 10, as suggested by FIG. 3, a foam including the emulsion of SBR fills at least a portion of the tire 10. When the first fluid 32 leaves the first pressurized container 22 into the larger volume of the tire 10, the first propellant is no longer dissolved into the sealant composition. The first propellant acts as a blowing agent, and the foaming agent(s) in the sealant composition reduce surface tension and enable the SBR emulsion to form bubbles or cells that are inflated by the first propellant. The walls of these bubbles or cells include the SBR emulsion. The foam forms and fills at least a portion of the tire 10, causing SBR to be distributed throughout the interior of the tire 10.

Figure 4:
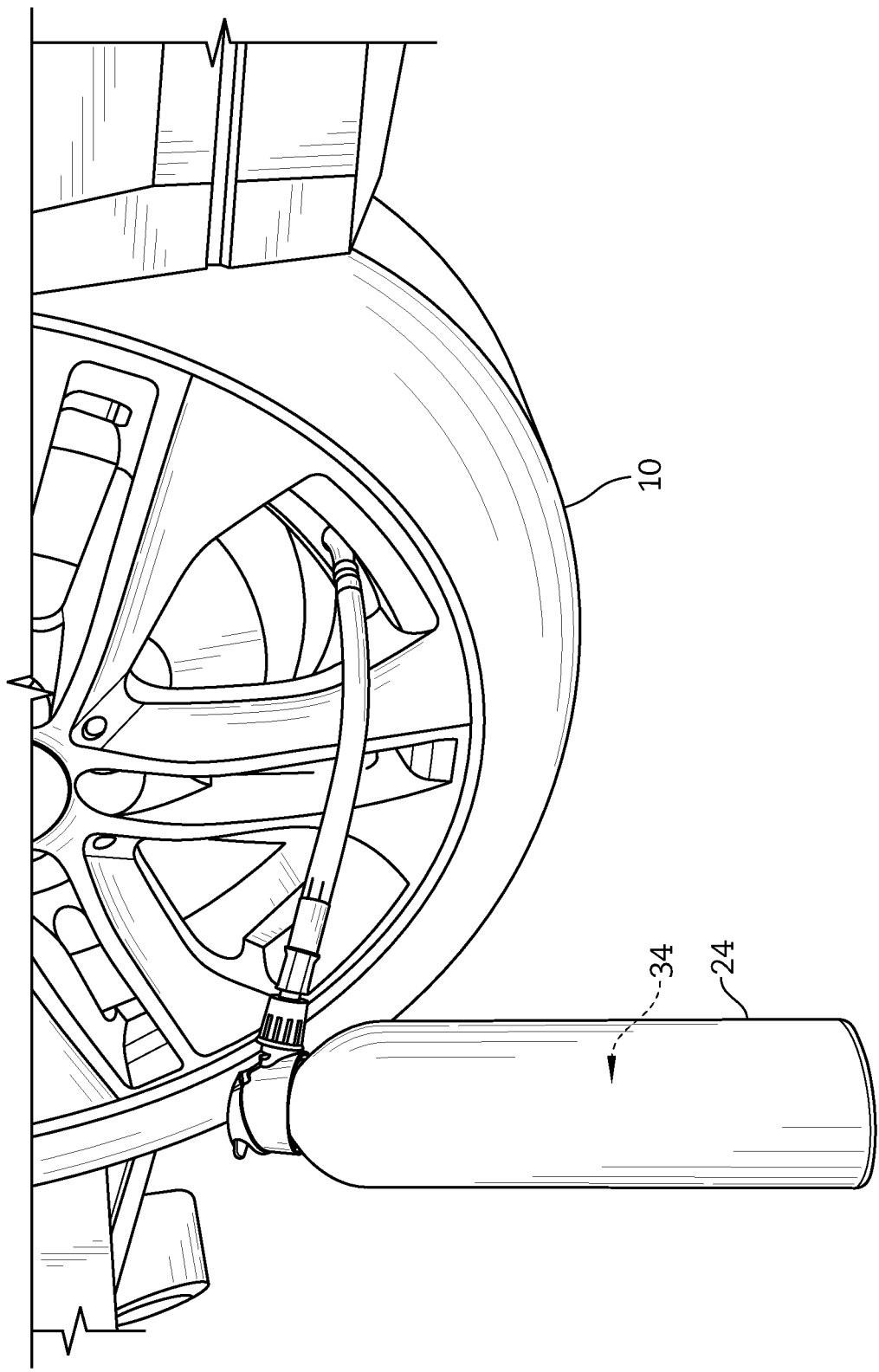
FIG. 4 is a perspective view of the tire and the second pressurized container from FIG. 1 without an in-line pressure gauge wherein the contents of the second pressurized container are being transferred to the tire.

When the second fluid 34 is transferred into the tire 10, as suggested by FIG. 4, the IPA, under high pressure from the second propellant, spreads throughout the tire 10 and intimately mixes with the SBR emulsion. The SBR emulsion breaks and agglomerated rubber particles form throughout the interior of the tire 10. The agglomerated rubber particles, bond together and to the walls of the tire 10, spread over the at least one hole or puncture 12 to seal the tire 10. As suggested by FIGS. 4 and 5, the second propellant pressurizes the tire 10 to a first pressure and fully inflates the tire 10. After a period of time, the interior of the tire 10 cools and the pressure inside the tire 10 lowers to a second pressure that is still sufficient to maintain inflation of the tire 10.

In an illustrative embodiment, a vehicle with the repaired tire 10 may be driven before the interior of the tire 10 cools. In other embodiments, a vehicle with the tire 10 may be driven after the interior of the tire 10 cools.

The first pressurized container 22 may have a variety of sizes. The volume of the target tire 10 may be considered to determine the minimum necessary size of the first pressurized container. The first pressurized container 22 may contain a volume of first fluid 32 from about 300 mL to about 600 mL. The first pressurized container 22 may contain a volume of first fluid 32 of about 300 mL, about 350 mL, about 400 mL, about 450 mL, about 500 mL, about 550 mL, or about 600 mL.

The second pressurized container 24 may have a size determined by the volume of a target tire and the preferred pressure may be considered to determine the proper size of the second pressurized container. The second pressurized container 24 may contain a volume of first fluid 32 from about 300 mL to about 600 mL. In some embodiments, the second pressurized container 24 may contain a volume of second fluid 34 of about 300 mL, about 350 mL, about 400 mL, about 450 mL, about 500 mL, about 550 mL, or about 600 mL.

Figure 5:
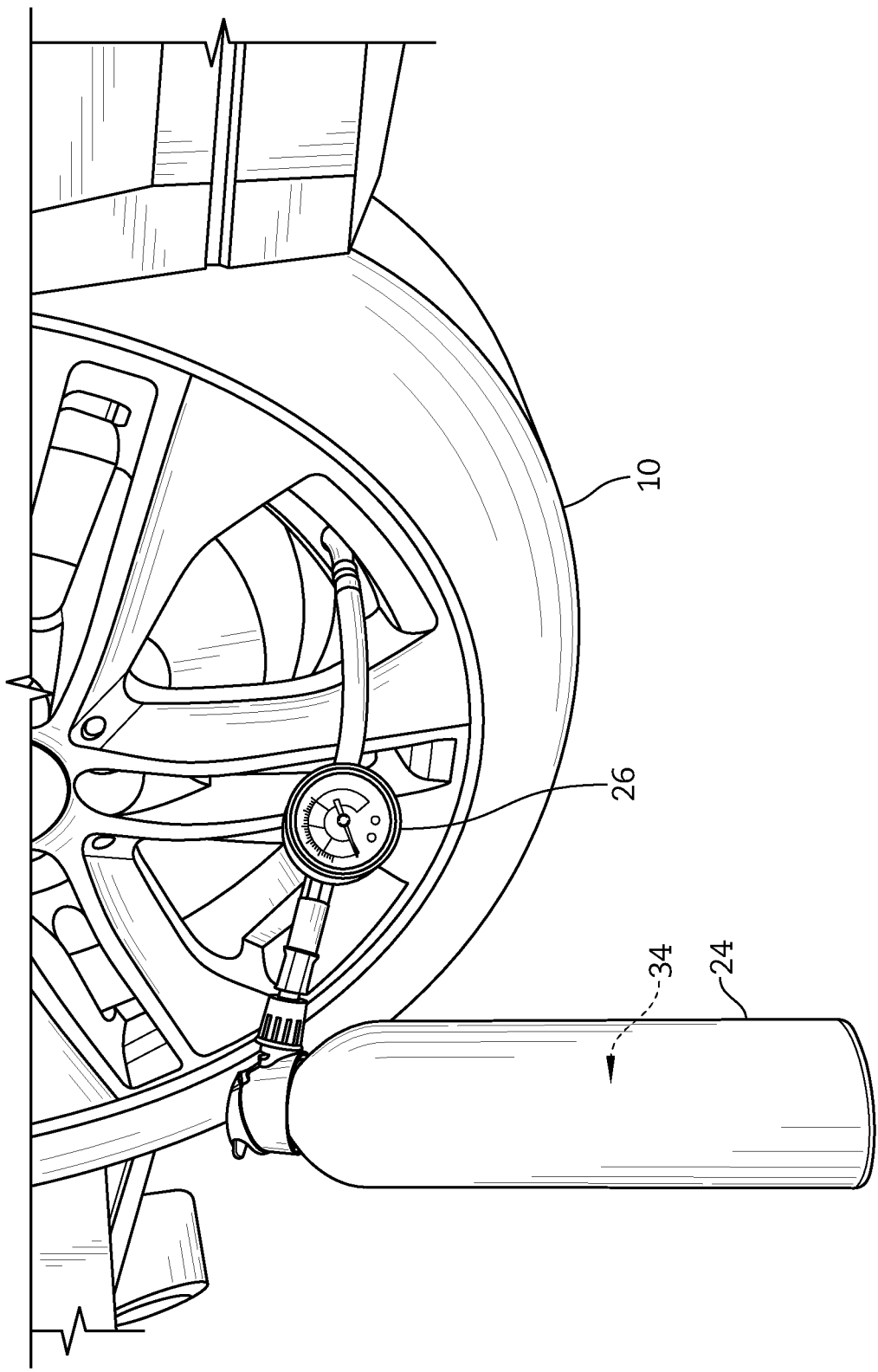
FIG. 5 is a perspective view similar to FIG. 4 wherein the second pressurized container includes the in-line pressure gauge.

In illustrative embodiments, the second pressurized container 24 may include an in-line pressure gauge 26, as suggested by FIG. 5. In such illustrative embodiments, the second pressurized container 24 may include the second fluid 34 and further comprise a delivery device attached to the second pressurized container for delivering the second fluid 34 from the container to the tire 10 to be repaired. The delivery device may comprise (1) an actuator for actuating a valve of the second pressurized container and for permitting, when actuated, the second fluid to be delivered from the container by means of a fluid flow path in fluid communication with the valve and (2) a pressure gauge in communication with the fluid flow path to measure a pressure within the fluid flow path. In embodiments with the in-line pressure gauge 26, the second pressurized container 24 may be larger than necessary to inflate the tire 10 to a desired pressure. A user may elect to transfer the contents of the second pressurized container into the tire 10 while watching the pressure gauge 26. When the pressure in the tire 10 reaches a target range, the user may elect to stop transferring the contents of the second pressurized container. In this manner, a large container, for example a container having a volume of 600 ml and which would be capable of filling most tires, can be utilized. The in-line pressure gauge 26 may eliminate the need for various different sizes of containers for differently sized tires.

In illustrative embodiments, the user may elect to stop transferring the contents of the second pressurized container 24 when the pressure in the tire 10 is from about 18 to about 50 psi. In other embodiments, the user may elect to stop transferring the contents of the second pressurized container 24 when the pressure in the tire 10 is from about 20 to about 40 psi. In some embodiments, the user may elect to stop transferring the contents of the second pressurized container 24 when the pressure in the tire 10 is from about 35 to about 40 psi.

Specific, non-limiting examples of the first and second fluids and the components thereof are included below:

TABLE 1

First Fluid

| First Fluid | wt %/wt |
|---|---|
| First Propellant | 5.789% |
| Sealant Composition | 94.211% |

TABLE 2

First Propellant

| First Propellant | wt %/wt |
|---|---|
| Butane | 46% |
| Isobutane | 23% |
| Propane | 1% |

TABLE 3

Second Fluid

| Second Fluid | wt %/wt |
|---|---|
| Second Propellant | 86.361% |
| Isopropyl Alcohol | 13.639% |

TABLE 4

| Second Propellant | wt %/wt |
|---|---|
| Butane | 46% |
| Isobutane | 23% |
| Propane | 1% |

Tables 1 to 4 in combination provide a preferred composition for use in a kit, method and containers of the present invention.

TABLE 5

A Preferred Sealant Composition

| Sealant Composition | | wt %/wt |
|---|---|---|
| Litex S61 (RTM) - Aqueous dispersion of a copolymer of styrene and 1,3-butadiene. (Concentration ca. 67%) | SBR dissolved in water | 47% |
| Water | Water | 31.088% |
| Potassium Oleate Premix | Potassium Oleate - foaming agent | 3% |
| Texapon ALS IS(RTM) | Ammonium Lauryl Sulfate - foaming agent | 0.812% |
| Antrancine 12 BHA (RTM) | BHA - antioxidant | 0.1% |
| Monopropylene Glycol | MPG - freezing depressant | 18% |
| Totals | Total SBR | 31.333% |
| | Total Water | 46.755% |
| | Total Foaming Agents | 3.812% |
| | Total Antioxidant | 0.1% |
| | Total Freezing Depressants | 18% |

For each trial below in Table 6, a P205/55/R16 tire had a 6 mm diameter hole drilled in between a middle of a tread pattern of the tire. The tire was fitted to a car and the hole was located on the upper half of the wheel circumference, between 9 and 3 o'clock as if on a clock face. A first pressurized container having a volume of 500 mL containing the first fluid from Table 1 was dispensed for approximately two minutes into the tire. Immediately afterwards, a second pressurized container having a volume of 500 mL containing the second fluid from Table 3 was dispensed for approximately two minutes into the tire. The car was driven immediately and stopped after 6 miles (10 km) to check the pressure. The car was driven a further 6 miles (10 km) for a total of twelve miles (20 km) and the pressure was checked again. The car was left overnight at ambient temperature with the location of the drilled hole in the tire facing directly upwards.

TABLE 6

| Trial | Pressure at 6 miles (10 km) | | Pressure at 12 miles (20 km) | | Pressure at 24 hours at ambient temperature | |
|---|---|---|---|---|---|---|
| | psig | kPag | psig | kPag | psig | kPag |
| 1 | 39 | 269 | 40.5 | 279.2 | * | * |
| 2 | 38 | 262 | 39 | 269 | 13.5 | 93.1 |
| 3 | 36 | 248 | 38 | 262 | * | * |
| 4 | 39 | 269 | 40 | 276 | * | * |
| 5 | 44 | 303 | 46 | 317 | 19 | 131 |
| 6 | 40 | 276 | 42 | 290 | 23 | 159 |
| 7 | 26 | 179 | 29 | 200 | 13 | 90 |
| 8 | 39 | 269 | 40.5 | 279.2 | 21.5 | 148.2 |
| 9 | 40 | 276 | 41.5 | 286.1 | 27 | 186 |
| 10 | 34 | 234 | 37.5 | 258.6 | 21.5 | 148.2 |
| Avg. | 37.5 | 258.6 | 39.4 | 271.7 | 19.79 | 136.4 |

* Data not available.

As seen in Table 6, after 6 miles (10 km) of driving, the hot gases inside the tire are at an average pressure of 37.5 psig (258.6 kPag). After 12 miles (20 km) of driving, the pressure increased further to an average of 39.4 psig (271.7 kPag). After 24 hours of cooling, where data was available, the tire maintained an average pressure of 19.79 psig (136.4 kPag). The tire maintained an acceptable pressure for driving even after cooling, enabling a car with a repaired tire to be able to seek a repair shop.

The experiment above was repeated with a Continental ContiMobility, a product currently on the market. For each trial below in Table 7, a P205/55/R16 tire had a 3 mm to 6 mm diameter hole drilled in between a middle of a tread pattern of the tire. The tire was fitted to a car and the hole was located on the upper half of the wheel circumference, between 9 and 3 o'clock as if on a clock face. The manufacturer's instructions for the Continental ContiMobility kit (450 mL) were followed. The 450 mL ContiMobility repair and inflation product was transferred into the tire and the pressure was measured. The car was driven immediately (to the extent possible) and stopped after 6 miles (10 km) to check the pressure. The car was driven (to the extent possible) a further 6 miles (10 km) for a total of twelve miles (20 km) and the pressure was checked again.

TABLE 7

| Trial | Product | Dispense Time | Puncture Type | Pressure After Inflation | | Pressure at 6 miles (10 km) | | Pressure at 12 miles (20 km) | |
|---|---|---|---|---|---|---|---|---|---|
| | | | | psig | kPag | psig | kPag | psig | kPag |
| 1 | ContiKit 450 mL | ~10 min | Drill 3 mm | 28 | 193.1 | 25.5 | 175.8 | 24 | 165.5 |
| 2 | ContiKit 450 mL | ~10 min | Drill 4 mm | 26 | 179.3 | 19 | 131 | 19 | 131 |
| 3 | ContiKit 450 mL | ~10 min | Drill 5 mm | Fail | | Fail | | Fail | |
| 4 | ContiKit 450 mL | ~10 min | Drill 6 mm | Fail | | Fail | | Fail | |

The Continental ContiMobility Kit failed to establish a seal for a 5 mm drilled hole and for a 6 mm drilled hole. Further, for the 4 mm drilled hole, slight bubbling after 12 miles indicated a very slow leak. The data in Table 6 for the preferred embodiment of the disclosed invention indicate a superior performance for larger punctures than the existing Continental ContiMobility Kit.

The invention claimed is:
1. A kit for repairing a tire, comprising,
   a first pressurized container including a first fluid, the first fluid comprising
   a first propellant, a styrene butadiene rubber emulsion and a foaming agent; and
   a second pressurized container including a second fluid, the second fluid comprising a second propellant and isopropyl alcohol.
2. The kit of claim 1, wherein the first propellant included in the first pressurized container is for dispersing a foam containing the styrene butadiene rubber throughout an interior of the tire.
3. The kit of claim 1, wherein the second propellant included in the second pressurized container is for inflating the tire.
4. The kit of claim 1, wherein the first fluid comprises:
   from 26 wt % to 34 wt % of styrene butadiene rubber,
   from 38 wt % to 52 wt % of water and
   from 2 wt % to 5.5 wt % of one or more foaming agents.
5. The kit of claim 4, wherein the first fluid comprises:
   from 1 wt % to 10 wt % of potassium oleate and
   from 0.1 wt % to 5 wt % of ammonium lauryl sulfate.
6. The kit of claim 5, wherein the first fluid comprises:
   from 0.01 wt % to 5 wt % of butylated hydroxyanisole.
7. The kit of claim 5, wherein the first fluid comprises:
   from 10 wt % to 32.89 wt % of monopropylene glycol.
8. The kit of claim 1, wherein the second fluid comprises:
   from 5 wt % to 25 wt % of isopropyl alcohol.
9. The kit of claim 8, wherein the second fluid comprises:
   from 60 wt % to 95 wt % of the second propellant.
10. A method for sealing a tire with a hole, comprising,
   providing a kit as provided in claim 1
   transferring a first fluid into the tire, the first fluid comprising a first propellant and an emulsion including styrene butadiene rubber and a foaming agent;
   transferring a second fluid into the tire after transferring the first fluid into the tire, the second fluid comprising a second propellant and isopropyl alcohol; and wherein an interaction between the styrene butadiene rubber in the first fluid and the isopropyl alcohol in the second fluid results in a plurality of rubber particles that agglomerate and seal the hole in the tire.

11. The method of claim 10, wherein the first fluid comprises:
   from 26 wt % to 34 wt % styrene butadiene rubber,
   from 38 wt % to 52 wt % water and
   from 2 wt % to 5.5 wt % of one or more foaming agents.

12. The method of claim 11, wherein the second fluid comprises:
   from 5 wt % to 25 wt % of isopropyl alcohol and from 60 wt % to 90 wt % of the second propellant.

* * * * *